United States Patent Office 3,825,628
Patented July 23, 1974

3,825,628
PASTES CONTAINING ACID, AMINES AND PHOSPHORIC ACID ESTERS
Gerhard Mietens, Efferen, Gerd Kohler, Junkersdorf, Hans Haas, Knapsack, and Hilmar Roszinski, Hurth-Kendenich, Germany, assignors to Knapsack Aktiengesellschaft, Knapsack, near Cologne, Germany
No Drawing. Filed Feb. 24, 1971, Ser. No. 118,523
Claims priority, application Germany, Mar. 21, 1970, P 20 13 627.0
Int. Cl. C07f 9/02
U.S. Cl. 260—920    7 Claims

ABSTRACT OF THE DISCLOSURE

Pastes containing acids and long-chain amines in combination with between 0.1 and 25 weight percent of one or more phosphoric acid esters, based on the paste, and process for making such pastes.

---

The present invention which relates to pastes containing acids, amines and phosphoric acid esters, and to a process for making them, is an improvement in, or modification of the pastes and/or process described in copending application Ser. No. 208,395, filed Dec. 15, 1971 by Friedrich Bölsing, assignor to Knapsack Aktiengesellschaft, which is a continuation-in-part application of application Ser. No. 44,900 filed June 9, 1970 by Friedrich Bölsing, assignor to Knapsack A.G., this latter application being meanwhile abandoned.

It is known that pastes can be produced by mixing a liquid with a sufficiently large quantity of a solid filler. These fillers are, however, not fully satisfactory, especially if use is made of the pastes for surface treatment of solid structures, from which the fillers are generally difficult to remove.

Further conventional pastes comprise an aqueous phosphoric acid and a saponifiable oil or a fatty acid transformable into soap. Such a paste is obtained, for example, by the steps comprising preparing in a first container a mixture of phosphoric acid and water, preparing in a second container a mixture of stearic acid and a tertiary amine, which is a surface-active agent, heating the two mixtures and pouring the mixture prepared in the second container into that prepared in the first container with the resultant formation of a thin, creamy mass, which thickens on standing overnight.

In the above U.S. application 208,395, it has been reported that paste bases containing phosphoric acid be produced by introducing preheated phosphoric acid with vigorous agitation, at elevated temperature and until neutral, into an aqueous dispersion of a long-chain amine, and stirring the resulting reaction mixture until cold. The amine is preferably used in the form of an aqueous emulsion, which is produced with the aid of a conventional emulsifier, such as a phosphoric acid ester.

These paste bases in turn are made into pastes for use in the treatment of metal surfaces, for example as metal cleaning agents or rust removers or polishing agents, or surfaces of concrete, conditional upon the addend incorporated later with the paste base.

Apart from the fact that two separate process steps are required to be taken for making the final paste and that continuous operation is impossible, the pastes inter alia have no satisfactory stability to shaking, which is disadvantageous.

We have now discovered that pastes containing acids and long-chain amines in combination with between 0.1 and 25 weight percent of a phosphoric acid ester are free from this disadvantageous phenomenon.

The useful phosphoric acid esters include, for example, phosphoric acid monoesters, diesters or triesters of primary, secondary or tertiary alkyl, alkenyl, aryl or alkylaryl alcohols having from 6 to 24 carbon atoms, and mixtures of these esters, more particularly the esters of alcohols having from 6 to 18 carbon atoms.

Still further, the esters may be alkoxylated, preferably ethoxylated, and contain between 1 and 25 alkoxy groups, preferably between 4 and 8 alkoxy groups.

Phosphoric acid esters suitable for use in the present invention are, for example, the esters of hexyl, 2-ethylhexyl, octyl, isooctyl, decyl, lauryl, isotridecyl, myristyl, cetyl, stearyl or oleyl alcohols, or of lauryldi-, tetra-, polyglycol ether, isotridecyl-, stearyl-, octyloctaglycol ether, tributylphenoltetra-, nonylphenoldi-, and nonylphenoltetraglycol ether.

The pastes of the present invention are unexpectedly obtained by the steps comprising (a) heating a mixture of acids, water, long-chain amines and phosphoric acid esters to temperatures higher than the fusion point of the amines or (b) adding the starting materials together at the temperature specified thoroughly mixing the resulting mixture, and allowing the mixture to cool.

The long-chain amines preferably include those which have a carbon chain of 12 to 18 carbon atoms, namely the corresponding alkyl amines, alkylene diamines or further amines having one or more amine functions of primary, secondary or tertiary nature linked to a long-chain substituted or unsubstituted hydrocarbon radical, for example stearyl amine, oleyl amine, or fatty amine mixtures, such as coconut oil fatty amine or tallow fatty amine.

The useful acids include inorganic or organic acids, such as sulfuric acid, hydrochloric acid, phosphoric acid, hydrofluoric acid, amidosulfonic acid, oxalic acid, tartaric acid or citric acid, for example.

The amine and phosphoric acid ester should conveniently be used in a ratio by weight of between 9:1 and 1:9, preferably between 4:1 and 7:1, and the acids should be used in a concentration which avoids decomposition of the amines by the acid, at the mixing temperatures.

Further components may be added during or following the preparation of the pastes, i.e. to the mixture of starting materials or to the finished pastes, this conditional upon the use the pastes are put to.

These further components include, for example, substances known as abrasives, polishing agents, metal cleaning or polishing agents or corrosion inhibitors, solvents miscible or immiscible with water, such as paraffin hydrocarbons, alcohols, or chlorinated hydrocarbons, as well as substances known to have surface-active properties, for example fatty amine oxethylates, nonylphenolpolyglycol ether, isotridecylpolyglycol ether, oxethylated 1-octylphenol or tributylphenolpolyglycol ether.

Beneficial effects of the process of the present invention reside in the substantially simplified operation and in the formation of final products which combine improved consistency and homogeneity with an improved storage life and stability to shaking, and which favorably distinguish in these properties over conventional pastes. In other words, the pastes produced in accordance with the present invention retain their consistency even after prolonged storage and do not separate into their components, even after shaking for hours.

It is also possible by the present invention to produce—this conditional upon the contemplated use—alkaline, neutral or strongly acid pastes for very widespread applications, especially in those cases in which the pastes contain abrasives, cleaning or polishing agents, or corrosion inhibitors.

The following Examples further illustrate the present invention without limiting it thereto.

EXAMPLE 1

53.4 weight percent of $H_3PO_4$ (calculated as acid of 100% strength) were placed in a beaker together with 4.7 weight percent of stearyl amine, 0.5 weight percent of a mixture comprised of phosphoric acid monoester and diester of oleyl alcohol-octaglycol ether, and 41.4 weight percent of water, and the whole was heated therein to 90° C., with agitation.

Following dissolution of all of the components, the reaction mixture was cooled.

A paste of solid and homogeneous consistency was obtained.

EXAMPLE 2

44.6 weight percent of $H_3PO_4$ (calculated as acid of 100% strength) were placed in a beaker together with 14.8 weight percent of petroleum, 7.0 weight percent of a mixture comprised of stearyl amine and oxethylated phosphoric acid triesters of lauryldiglycol ether and polyglycolether (in the ratio by weight of amine/esters=4:1), and 33.6 weight percent of water, and the whole was heated therein to 90° C., with agitation.

Following dissolution of all of the components, the reaction mixture was cooled.

A vaseline-like paste of fine consistency which assumed its final consistency after a period of 1 to 2 days was obtained.

EXAMPLE 3

25.5 weight percent of HCl (calculated as acid of 100% strength) were placed in a beaker together with 5.2 weight percent of a mixture comprised of stearyl amine and phosphoric acid monoester and diester of stearyl alcohol octaglycol ether (in the ratio by weight of amine/ester mixture=6:1) and 69.3 weight percent of water, and the whole was heated therein to 90° C. with agitation.

Following dissolution of all of the components, the reaction mixture was cooled.

A paste of solid and homogeneous consistency was obtained.

EXAMPLE 4

54.0 weight percent of $H_2SO_4$ (calculated as acid of 100% strength) were placed in a beaker together with 7.0 weight percent of a mixture comprised of stearyl amine and phosphoric acid triesters of lauryldiglycol ether and polyglycol ether (in the ratio by weight of amine/ester mixture=5:1), and 39.0 weight percent of water, and the whole was heated therein to 90° C., with agitation.

Following dissolution of all the components, the reaction mixture was cooled.

A paste of fine and homogeneous consistency was obtained.

EXAMPLE 5

34.7 weight percent of $H_3PO_4$ (calculated as acid of 100% strength) were placed in a beaker together with 11.5 weight percent of petroleum, 22.9 percent of polishing alumina as an abrasive, 7.0 weight percent of a mixture comprised of stearyl amine and phosphoric acid monoester and diester of stearyl alcohol octaglycol ether (in the ratio by weight of amine/ester mixture=5:1), and 23.9 weight percent of water, and the whole was heated therein to 90° C., with agitation.

Following dissolution of the amine/ester mixture, the reaction mixture was cooled. A polishing paste ready for use was obtained.

EXAMPLE 6

15.7 weight percent of amidosulfonic acid (calculated as acid of 100% strength) were placed in a beaker together with 7.0 weight percent of a mixture comprised of stearyl amine and phosphoric acid monoester and diester of stearyl alcohol octaglycol ether (in the ratio by weight of amine/ester mixture=5:1), and 77.3 weight percent of water, and the whole was heated therein to 90° C., with agitation.

Following dissolution of all of the components, the reaction mixture was cooled.

A paste of fine and homogeneous consistency was obtained.

EXAMPLE 7

20.0 weight percent of citric acid (calculated as acid of 100% strength) were placed in a beaker together with 7.0 weight percent of a mixture comprised of stearyl amine and phosphoric acid monoester and diester of stearyl alcohol octaglycol ether (in the ratio by weight of amine/ester mixture=5:1), and 73.0 weight percent of water, and the whole was heated therein to 90° C., with agitation.

Following dissolution of all of the components, the reaction mixture was cooled.

A paste of fine and homogeneous consistency was obtained.

EXAMPLE 8

7.0 weight percent of $H_3PO_4$ (calculated as acid of 100% strength) and 3.0 weight percent of citric acid (calculated as acid of 100% strength) were placed in a beaker together with 10.0 weight percent of a mixture comprised of stearyl amine and phosphoric acid monoester and diester of stearyl alcohol octaglycol ether (in the ratio by weight of amine/ester mixture=1:1), 0.7 weight percent of fatty amine oxethylates as surface-active substances, and 77.3 weight percent of water. The whole was heated therein to 90° C. with agitation.

Following dissolution of all of the components, the reaction mixture was cooled down to 50° C. and 2.0 weight percent of iso-propanol were added thereto.

A paste of fine consistency was obtained.

EXAMPLE 9

7.0 weight percent of $H_3PO_4$ (calculated as acid of 100% strength) and 3.0 weight percent of citric acid (calculated as acid of 100% strength) were placed in a beaker together with 1.4 weight percent of fatty amine oxethylates as surface-active substances, 5.0 weight percent of stearyl amine, 5.0 weight percent of phosphoric acid monoester and diester of stearyl alcohol octaglycol ether, 5.0 weight percent of tetrachloroethylene and 73.6 weight percent of water. The whole was heated therein to 90° C., with agitation.

Following dissolution of all of the components, the reaction mixture was cooled.

A paste of fine consistency was obtained.

EXAMPLE 10

36 weight percent of HF (calculated as acid of 100% strength) were placed in a beaker together with 10 parts by weight of a mixture comprising stearyl amine and oxethylated phosphoric acid monoester and diester of lauryldiglycol ether and polyglycol ether (in the ratio by weight of amine/ester mixture=4:1), and 54 weight percent of water. The whole was heated therein to 90° C., with agitation.

Following dissolution of all the components, the reaction mixture was cooled.

A paste of solid and homogeneous consistency was obtained.

All of the pastes produced in the manner described in the preceding Examples could not be found to decompose into their components, even after prolonged storage, and they substantially retained their consistency, even after having been shaken for hours.

The amines and esters used in the preceding Examples may well be replaced by the compounds first described hereinabove. Those phosphoric acid esters, which are solid at room temperature, should preferably be dissolved in water, prior to using them.

We claim:

1. Pastes consisting essentially of the reaction product of a homogeneous aqueous mixture which consists of (a) acid selected from the group consisting of sulfuric acid, hydrochloric acid, phosphoric acid, hydrofluoric acid, amidosulfonic acid, oxalic acid, tartaric acid and citric acid, and mixtures thereof, (b) amine selected from the group consisting of primary, secondary or tertiary alkylamines and alkylene diamines having a carbon chain of between 12 and 18 carbon atoms, and mixtures of such amines, (c) phosphoric acid ester selected from the group consisting of phosphoric acid monoesters, diesters and triesters of primary, secondary and tertiary alkyl alcohols, alkylene alcohols, aryl alcohols, alkylaryl alcohols having from 6 to 24 carbon atoms, and alkoxylated products of said esters in a proportion of between 0.1 and 25 weight percent, based on the reaction product and in a ratio by weight of between 9:1 and 1:9 based on the amine, the said reaction product being obtained by producing an intimate mixture of the said components, the said mixture having a temperature above the fusion point of the amine and cooling down the said mixture to room temperature, with the resultant formation of a paste having a high stability to shaking, the concentration of said acid being that which avoids decomposition of said amine by said acid at the reaction temperature.

2. The pastes as claimed in claim 1, wherein the phosphoric acid esters are of alcohols having from 12 to 18 carbon atoms.

3. The pastes as claimed in claim 1, wherein the phosphoric acid esters are alkoxylated.

4. The pastes as claimed in claim 1, wherein the phosphoric acid esters are ethoxylated.

5. The pastes as claimed in claim 1, wherein the phosphoric acid esters have from 1 to 25 alkoxy groups.

6. The pastes as claimed in claim 5, wherein the phosphoric acid esters have from 4 to 8 alkoxy groups.

7. The pastes as claimed in claim 1, wherein said esters are a member selected from the group consisting of phosphoric acid esters of hexyl-, 2-ethylhexyl-, octyl-, isooctyl-, decyl-, lauryl-, isotridecyl-, myristyl-, cetyl-, stearyl- or oleyl alcohol, or of lauryldi-, tetra-, polyglycol ether, or of isotridecyl-, stearyl-, oleyloctaglycol ether, or of tributylphenoltetra-, nonylphenoldi- and nonylphenoltetraglycol ethers, and mixtures thereof.

References Cited

UNITED STATES PATENTS

| | | | |
|---|---|---|---|
| 2,574,517 | 11/1951 | Walter et al. | 260—984 X |
| 2,508,428 | 5/1950 | Smith et al. | 260—925 X |
| 2,508,430 | 5/1950 | Smith et al. | 260—925 X |
| 2,891,909 | 6/1959 | Hughes | 260—924 X |
| 3,294,816 | 12/1966 | Latos et al. | 260—925 X |
| 3,388,191 | 6/1968 | Cyba | 260—925 |
| 3,451,929 | 6/1969 | Latos | 260—924 X |

LORRAINE R. WEINBERGER, Primary Examiner

R. L. RAYMOND, Assistant Examiner

U.S. Cl. X.R.

252—136, 143, 144, 148, 311; 260—924, 925, 968, 984